United States Patent [19]

Duchane et al.

[11] 4,448,622
[45] May 15, 1984

[54] COMPOSITE POLYMERIC FILM AND METHOD FOR ITS USE IN INSTALLING A VERY THIN POLYMERIC FILM IN A DEVICE

[75] Inventors: David V. Duchane, Los Alamos; Barry L. Barthell, Tesuque, both of N. Mex.

[73] Assignee: The United States of America as represented by the United States Department of Energy, Washington, D.C.

[21] Appl. No.: 371,745

[22] Filed: Apr. 26, 1982

[51] Int. Cl.³ .................. B32B 31/00; B32B 27/42
[52] U.S. Cl. ........................... 156/155; 156/230; 156/655; 156/668; 428/213; 428/501; 428/503; 428/507; 428/508; 428/515; 428/520; 428/524; 428/526; 428/534; 428/914
[58] Field of Search ............... 428/213, 515, 520, 501, 428/503, 508, 524, 526; 525/61; 428/411, 507, 428, 534, 914; 156/155, 230, 655, 668

[56] References Cited

U.S. PATENT DOCUMENTS

| | | | |
|---|---|---|---|
| 3,484,409 | 12/1969 | Ashikaga et al. | 525/61 |
| 3,505,264 | 4/1970 | Thoese et al. | |
| 3,859,125 | 1/1975 | Miller et al. | 428/116 |
| 4,119,604 | 10/1978 | Wysong | 428/220 |
| 4,372,311 | 2/1983 | Potts | 428/507 |
| 4,379,805 | 4/1983 | Downing et al. | 525/61 |

*Primary Examiner*—George F. Lesmes
*Assistant Examiner*—E. Rollins Buffalow
*Attorney, Agent, or Firm*—William A. Eklund; Paul D. Gaetjens

[57] ABSTRACT

A composite polymeric film and a method for its use in forming and installing a very thin ($<10$ $\mu$m) polymeric film are disclosed. The composite film consists of a thin film layer and a backing layer. The backing layer is soluble in a solvent in which the thin film layer is not soluble. In accordance with the method, the composite film is installed in a device in the same position in which it is sought to finally emplace the thin film. The backing layer is then selectively dissolved in the solvent to leave the insoluble thin film layer as an unbacked film. The method permits a very thin film to be successfully installed in devices where the fragility of the film would preclude handling and installation by conventional methods.

14 Claims, No Drawings

COMPOSITE POLYMERIC FILM AND METHOD FOR ITS USE IN INSTALLING A VERY THIN POLYMERIC FILM IN A DEVICE

This invention is the result of a contract with the Department of Energy (Contract No. W-7405-ENG-36).

BACKGROUND OF THE INVENTION

The invention disclosed herein relates generally to plastic polymeric films and methods of making the same. More particularly, this invention relates to methods of forming and installing a very thin polymeric film in a device, under conditions where the fragility of the film would ordinarily make its handling and installation difficult or impossible.

Very thin (<10 μm) polymeric films are useful in many well known applications. Representative applications in connection with which the present invention was developed include the use of polymeric films as barriers to moisture, dust and gases; and as frequency-specific radiation filters. In such applications, the film is ordinarily emplaced in a device where it is subject only to small static stresses under controlled conditions. Once installed, the film, even though very fragile, is sufficiently strong and flexible to perform its intended function without rupturing. It is often difficult, however, to initially assemble such devices. This difficulty lies not so much in the formation of the film itself, as there are various well known methods of making thin films, but rather in the handling and installation of the film without tearing it. In some cases, this difficulty effectively imposes a lower limit on the thickness of film which may be routinely installed in a device.

Accordingly, it is the object and purpose of the present invention to provide a method of forming and installing very thin polymeric films.

It is also an object of the present invention to provide a method of forming and installing very thin polymeric films in situ in a device in which the film is to be utilized Additionally, for reasons that will be apparent from the description of the invention set forth below, it is an object of the invention to provide a composite film for use in installing a thin film in a device.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities, combinations and methods particularly pointed out in the appended claims.

SUMMARY OF THE INVENTION

To achieve the foregoing objects and other objects, and in accordance with the purposes of the present invention as embodied and broadly described herein, there is provided a composite polymeric film and a method for its use for the purpose of installing a very thin polymeric film in a device. The composite film comprises two layers; a thin film layer, which is the film to be installed in the device, and a relatively thick backing layer. The backing layer supports the thin film layer and enables it to be handled in a routine manner without tearing. In accordance with the method of application, the composite film is installed in the device where it is sought to emplace the thin film. The device, together with the composite film, is then immersed in a suitable solvent to selectively dissolve the backing layer and leave the thin film layer as an unbacked film formed in situ in the device.

In accordance with a preferred aspect of applicant's invention, the composite film comprises a backing layer consisting essentially of polyvinyl alcohol and a thin film layer consisting essentially of polyvinyl formal. The polyvinyl alcohol backing layer is readily soluble in water at room temperature, whereas the polyvinyl formal film in insoluble in water. Further, the surface chemistries of these materials are particularly compatible so as to permit a very thin, uniform film of polyvinyl formal to be cast onto a backing layer of polyvinyl alcohol. Such a composite film can be prepared well in advance of its installation and can be handled, stored, shipped, and installed without undergoing damage to the thin film layer. Other combinations of polymeric materials that may be used to form the composite film are set forth below.

DETAILED DESCRIPTION OF THE PREFERRED EMBODIMENT

In accordance with the preferred embodiment of the invention, a composite film is formed which consists of a polyvinyl alcohol backing layer and a thin layer of polyvinyl formal. This may preferably be done by solution casting the polyvinyl alcohol onto a smooth surface of glass or stainless steel. The polyvinyl formal layer may be subsequently deposited, also by solution casting, onto the polyvinyl alcohol layer while it is still on the substrate surface. The resulting composite film may then be peeled from the substrate surface and subsequently handled, shipped, or stored with little danger of tearing or puncturing.

To use the composite film in accordance with the invention, it is installed in the same manner and position in which the thin film layer is desired to be ultimately positioned. The assembly is then immersed in a water bath to dissolve the backing layer and leave the thin film layer as an unbacked film properly positioned in the device.

Polyvinyl alcohol is ordinarily prepared by hydrolysis of polyvinyl acetate. In this regard, it is found that optimum solubility in water at room temperature is obtained with polyvinyl acetate that is not completely hydrolyzed. Adequate solubility in water at room temperature is obtained with polyvinyl acetate that is between 75 and 95% hydrolyzed. Optimum solubility is obtained with polyvinyl acetate that is approximately 88% hydrolyzed, i.e., a polyvinyl polymer consisting of 88% polyvinyl alcohol and 12% polyvinyl acetate. A suitable polyvinyl alcohol polymer of this type is commercially available, for example, from Aldrich Chemical Company of Milwaukee, WI.

The polyvinyl alcohol backing layer is preferably formed by solution casting onto a mold or other solid substrate, which may be coated with a mold release agent. The mold is briefly dipped in an aqueous solution of polyvinyl alcohol and subsequently air dried to form a backing layer of polyvinyl alcohol approximately 25 μm thick. To prepare such a film requires an aqueous solution of polyvinyl alcohol having a viscosity between approximately 200–10,000 centipoises, with the preferred range being from approximately 1000–3000 centipoises. These ranges correspond to aqueous solutions having from 6 to 15% and from 8 to 12% by weight polyvinyl alcohol, respectively.

Other suitable water soluble film materials which may be used to prepare the backing layer include cellulose ethers, sodium carboxymethyl cellulose, polyoxyethylene, and the like.

Polyvinyl formal is the preferred material for the formation of the thin film layer because it is insoluble in water and, also, because solutions of polyvinyl formal in organic solvents are found to thoroughly wet the surface of a dry polyvinyl alcohol film, such that a uniform thin film layer can be cast onto a backing layer of polyvinyl alcohol. In this regard, it is important that the solution used to form the thin film layer have the proper surface tension characteristics such that it uniformly wets the first film surface, or backing layer.

Another polymeric material which is suitable for forming the thin film layer is di-p-xylylene, which is sold under the tradename Parylene by Union Carbide Corporation. Di-p-xylylene is relatively inert to chemical attack and is not soluble in water. A thin film of di-p-xylylene may be formed on a suitable backing layer, for example a water-soluble film of polyvinyl alcohol formed as described above, by a technique known as vapor phase polymerization. This technique has been previously known for forming thin films of di-p-xylylene, and may be utilized to form a thin film layer approximately 1 μm thick on a backing layer of polyvinyl alcohol.

Another polymeric material which may be used to form a water-insoluble thin film layer is cellulose acetate. A thin film layer of cellulose acetate may be formed on a polyvinyl alcohol backing layer by solution casting from a solution of cellulose acetate dissolved in acetone.

In an inverse application of the immediately foregoing example, a thin film layer of polyvinyl alcohol may be cast from a water solution onto a backing layer of cellulose acetate. After mounting of the composite film, the cellulose acetate layer may be selectively dissolved by immersion in acetone, leaving an unbacked thin film of polyvinyl alcohol.

In actual tests of the method, thin polymeric films ranging in thickness from 0.5 to 25 μm have been produced. The backing layer is typically 10 to 250 μm thick. The following description of a demonstrative test more clearly illustrates the practice of the method.

EXAMPLE 1

In an exemplary demonstration of the method described above, a stainless steel ring having a highly polished, cylindrical inner surface was selected as a casting surface. The ring was dipped in an aqueous solution containing approximately 9.8% by weight polyvinyl alcohol (88% hydrolyzed), and 2.4% by weight glycerin as a plasticizer. The ring was subsequently air dried. This produced a backing layer approximately 10 μm thick. The coated ring was then dipped in a solution consisting of polyvinyl formal (10% by weight) dissolved in a mixture consisting of 20% (by volume) methyl benzoate, 48% by volume toluene, and 32% by volume ethanol. The wetted ring was then air dried. This produced a thin polymer film layer approximately 1 μm thick on the underlying polyvinyl alcohol backing layer. The resulting composite film was manually peeled from the ring and was found to be sufficiently rugged to withstand ordinary handling.

The tubular composite film was then cut along one side to form a planar film. This composite film was stretched over a rectangular frame having an open area of dimensions of 5×20". The film was clamped at the edges and the assembly was immersed in water, taking care to avoid disturbances in the water which would rupture the thin film. Dissolution of the polyvinyl alcohol backing layer was complete in a few seconds, leaving the thin polyvinyl formal film spanning and unbacked area of approximately 100 square inches.

The foregoing description of a preferred embodiment of the invention has been presented for purposes of illustration and description. It is not intended to be exhaustive or to limit the invention to the precise form disclosed, and obviously many modifications any variations are possible in light of the above teaching. In particular, there may be various combinations of film materials which may be apparent to a chemist of ordinary skill as being suitable for the practice of the invention. The embodiments described above were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A composite polymeric film for use in installing a very thin polymeric film in a device, comprising a water soluble backing layer selected from the group consisting of polyvinyl alcohol, cellulose ether, sodium carboxymethyl cellulose and polyoxyethylene, and a thin film layer selected from the group consisting of polyvinyl formal, polymeric di-p-xylylene and cellulose acetate, and wherein said backing layer is relatively thicker than said thin film layer.

2. The composite polymeric film defined in claim 1 wherein said polyvinyl alcohol is between 75 and 95 percent hydrolyzed.

3. The composite polymeric film defined in claim 2 wherein said backing layer further includes a plasticizer.

4. The composite polymeric film defined in claim 3 wherein said plasticizer consists of glycerin.

5. A method of installing a thin polymeric film in a device, comprising the steps of:
   forming a composite film consisting essentially of a backing layer and a thin film layer, said backing layer being relative thicker than said thin film layer, said backing layer being soluble in at least one solvent in which said thin film layer is insoluble;
   installing said composite film in a device in a position in which it is desired to install said thin film; and
   immersing said device together with said composite film in a suitable solvent to dissolve said backing layer and leave said film layer as an unbacked thin polymeric film installed in the device.

6. The method of claim 5 wherein said thin film layer consists essentially of polyvinyl formal.

7. The method of claim 6 wherein said backing layer consists essentially of polyvinyl alcohol.

8. The method of claim 7 wherein said backing layer consists essentially of polyvinyl alcohol which is between 75 and 95 percent hydrolyzed.

9. The method of claim 8 wherein said backing layer further includes a plasticizer.

10. The method of claim 9 wherein said plasticizer is glycerin.

11. The method of claim 5 wherein said thin film layer consists essentially of di-p-xylylene.

12. The method of claim 5 wherein said film layer consists essentially of cellulose acetate.

13. The method of claim 11 or 12 wherein said backing layer consists essentially of polyvinyl alcohol.

14. The methods of claim 13 wherein said polyvinyl alcohol is between 75 and 95 percent hydrolyzed.

* * * * *